(12) United States Patent
Dalle Donne et al.

(10) Patent No.: US 10,987,755 B2
(45) Date of Patent: Apr. 27, 2021

(54) METHOD AND APPARATUS FOR DISTORTION CONTROL ON ADDITIVELY MANUFACTURED PARTS USING WIRE FEED AND MAGNETIC PULSES

(71) Applicants: Airbus Defence and Space GmbH, Ottobrunn (DE); Airbus Group Limited, London (GB)

(72) Inventors: Claudio Dalle Donne, Bremen (DE); Christian Karch, Neubiberg (DE); Jonathan Meyer, Bristol (GB)

(73) Assignees: AIRBUS DEFENCE AND SPACE GMBH, Ottobrunn (DE); AIRBUS OPERATIONS LIMITED, Bristol (GB)

(*) Notice: Subject to any disclaimer, the term of this patent is extended or adjusted under 35 U.S.C. 154(b) by 634 days.

(21) Appl. No.: 14/966,784

(22) Filed: Dec. 11, 2015

(65) Prior Publication Data
US 2016/0175984 A1  Jun. 23, 2016

(30) Foreign Application Priority Data

Dec. 17, 2014 (EP) ..................................... 14198613
Jan. 7, 2015 (EP) ..................................... 15150312

(51) Int. Cl.
*B23K 26/00* (2014.01)
*B23K 26/342* (2014.01)
(Continued)

(52) U.S. Cl.
CPC .......... *B23K 26/0093* (2013.01); *B23K 9/044* (2013.01); *B23K 26/0861* (2013.01);
(Continued)

(58) Field of Classification Search
CPC ........ B23K 26/00; B23K 26/70; B23K 26/08; B23K 26/342; B23K 26/0093;
(Continued)

(56) References Cited

U.S. PATENT DOCUMENTS 3,924,092 A * 12/1975 Lessmann ................ B23K 9/04
                                                        219/76.15
4,190,760 A *  2/1980 Kano ....................... B23K 9/08
                                                        219/123
(Continued)

FOREIGN PATENT DOCUMENTS

EP       0832710 A1    4/1998
JP       2003181643  *  2/2003

OTHER PUBLICATIONS

Translation JP 2003181643.*
(Continued)

*Primary Examiner* — Ibrahime A Abraham
*Assistant Examiner* — Frederick F Calvetti
(74) *Attorney, Agent, or Firm* — Hoffmann & Baron, LLP

(57) ABSTRACT

The invention provides a method and apparatus for forming a freeform metal structure by wire feed additive manufacturing. In accordance with the method, a holding structure is moved in at least one moving direction, the holding structure holding the metal structure. A metal wire end is fed along an area of deposition on the metal structure in the at least one moving direction. The metal wire end is heated to a melting temperature using a heat source, with the metal wire end as melted being deposited on the metal structure as a metallic build-up material. The metallic build-up material after heating and during the cooling is subjected in the at least one moving direction behind the area of deposition to at least one pulsed magnetic field using a magnetic coil arranged after
(Continued)

the heat source, the at least one pulsed magnetic field effecting plastic deformation of the build-up material.

13 Claims, 2 Drawing Sheets

(51) Int. Cl.
| | |
|---|---|
| *B23K 9/04* | (2006.01) |
| *B23K 26/70* | (2014.01) |
| *B23K 26/08* | (2014.01) |
| *B33Y 10/00* | (2015.01) |
| *B33Y 30/00* | (2015.01) |
| *B33Y 40/00* | (2020.01) |

(52) U.S. Cl.
CPC .......... *B23K 26/342* (2015.10); *B23K 26/702* (2015.10); *B33Y 10/00* (2014.12); *B33Y 30/00* (2014.12); *B33Y 40/00* (2014.12)

(58) Field of Classification Search
CPC .. B23K 26/702; B23K 26/0861; B23K 9/044; B33Y 30/00; B33Y 10/00
See application file for complete search history.

(56) References Cited

U.S. PATENT DOCUMENTS

| | | | | |
|---|---|---|---|---|
| 4,309,587 A * | 1/1982 | Nakano | ............... | B23K 25/005 219/123 |
| 5,114,499 A * | 5/1992 | Kusunoki | ............... | C21D 1/09 148/512 |
| 5,932,121 A * | 8/1999 | Manabe | .................. | B23K 9/08 219/123 |
| 6,023,043 A * | 2/2000 | Manabe | .................. | B23K 9/08 219/123 |
| 6,617,547 B1 * | 9/2003 | Abdurachmanov | . | B23K 9/0737 219/123 |
| 6,830,173 B2 * | 12/2004 | Barber | ..................... | B25C 1/06 173/117 |
| 9,498,838 B2 * | 11/2016 | Peters | .................... | B23K 9/092 |
| 10,035,211 B2 * | 7/2018 | Peters | .................. | B23K 9/1006 |
| 2012/0255370 A1 * | 10/2012 | Rieder | .................. | G01F 1/8404 73/861.357 |
| 2013/0092667 A1 * | 4/2013 | Peters | .................... | B23K 26/20 219/121.64 |
| 2013/0256287 A1 * | 10/2013 | Cole | .................... | B23K 9/0216 219/122 |
| 2013/0256288 A1 * | 10/2013 | Matthews | ............ | B23K 9/0737 219/123 |
| 2014/0061165 A1 * | 3/2014 | Stempfer | ............... | B33Y 10/00 219/73.21 |
| 2014/0263229 A1 * | 9/2014 | Peters | .................. | B23K 9/1006 219/130.1 |
| 2014/0263230 A1 * | 9/2014 | Peters | .................. | B23K 9/1006 219/130.1 |
| 2015/0028012 A1 * | 1/2015 | Peters | .................... | B23K 9/092 219/130.51 |
| 2015/0064047 A1 * | 3/2015 | Hyde | .................... | B23K 26/144 419/26 |
| 2015/0064050 A1 * | 3/2015 | Retze | .................... | B22F 3/1055 419/53 |
| 2015/0165693 A1 * | 6/2015 | Sagoo | .................... | B33Y 50/02 419/10 |
| 2015/0174822 A1 * | 6/2015 | Huang | .................. | C04B 35/653 264/497 |
| 2015/0209908 A1 * | 7/2015 | Peters | ................ | B23K 26/1423 219/76.14 |
| 2015/0251250 A1 * | 9/2015 | Schlick | .................. | B33Y 30/00 419/29 |
| 2015/0367417 A1 * | 12/2015 | Buller | .................... | B22F 3/105 419/53 |
| 2016/0288264 A1 * | 10/2016 | Jones | ........................ | B22F 7/08 |
| 2016/0297104 A1 * | 10/2016 | Guillemette | ............ | B29C 48/05 |
| 2016/0375492 A1 * | 12/2016 | Bencher | ................ | B33Y 30/00 419/26 |
| 2017/0129185 A1 * | 5/2017 | Buller | ................. | B28B 17/0081 |
| 2017/0355147 A1 * | 12/2017 | Buller | ................. | B23K 26/032 |
| 2018/0290240 A1 * | 10/2018 | Rudnicki | ............... | B33Y 30/00 |
| 2018/0318932 A1 * | 11/2018 | Myerberg | ............ | B29C 64/106 |

OTHER PUBLICATIONS

Bachmann et al, ,inter. Jr. of Heat and Mass Transfer, p. 309-321, (2013) ,vol. 60.*
Office Action issued in European Patent Application No. 15 150 312.5 dated Oct. 31, 2017.
Search Report issued in European Patent Application No. 15 150 312.5 dated Apr. 18, 2016.

* cited by examiner

METHOD AND APPARATUS FOR DISTORTION CONTROL ON ADDITIVELY MANUFACTURED PARTS USING WIRE FEED AND MAGNETIC PULSES

CROSS REFERENCE TO RELATED APPLICATIONS

This application claims priority to European Patent Application No. EP 15 150 312.5, filed on Jan. 7, 2015, which claims priority to European Patent Application No. EP 14 198 613.3, filed on Dec. 17, 2014, both of which are incorporated herein by reference in their entirety.

BACKGROUND

Field of Technology

The invention relates to a method and an apparatus for forming a freeform metal structure using a combination of wire feed additive manufacturing and electromagnetic forming.

Brief Discussion of Related Art

It is known in the state of the art to manufacture parts using wire feed additive manufacturing resulting in saving processing time and costs. The method of wire feed additive manufacturing includes a heat source for providing a melting pool on a metal structure into which a metal wire is subsequently fed and being deposited on a metal structure in a liquid state, which allows exceptional time saving potentials compared to conventional forming techniques such as milling from bulk, forging or casting. On the other hand, wire feed additive manufacturing brings along solidifying and cooling effects shortly after deposition, which result in distortion in the parts being manufactured due to shrinking processes in the deposited build-up materials. Consequently, high-level residual stresses might occur leading to the formation of part cracks during the build-up process. If no cracks are detectable, the distortion within the build-up material can still be corrected by carrying out subsequent forming procedures or by adding post-weld heat treatments to the deformed material in the affected areas. However, this can lead to considerable inaccuracies in the manufacturing process, resulting in poor dimensional manufacturing tolerances.

Furthermore, it is known to combine wire feed additive manufacturing with after-deposition rolling treatment to refine possibly distorted microstructures where a rolling device being able to withstand rolling forces up to 100 kN is required while simultaneously ensuring provision of the desired accuracies when depositing the build-up material using wire feed additive manufacturing.

SUMMARY

Therefore, it is object of the present invention to provide a method allowing use of wire feed additive manufacturing without encountering induced side effects like distortion build-up in the areas which have been built up using wire feed additive manufacturing.

This object is solved by the features set out in the independent claims. Beneficial embodiments and arrangements of the inventions are subject of the dependent claims. Further advantages of the invention are provided in the following description and the explanations of preferred embodiments, which are presented in the drawings.

The problem is solved by a method for forming a freeform metal structure by wire feed additive manufacturing, wherein a metal wire end is moved along an area of deposition and is melted by a heat source, the melting being deposited on the metal structure as a metallic build-up material, whereby the method is characterized in that during the cooling process the build-up material is subjected to at least one pulsed magnetic field effecting plastic deformation of the build-up material. The main principle used in the solution to the problem is to subject the build-up material to at least one pulsed magnetic field resulting in plastic deformation of the material, which has been deposited using wire feed additive manufacturing. This at least one magnetic pulse causes Lorentz forces resulting from an opposite-directed interaction of the magnetic field caused by the magnetic pulse with currents being induced in the material, leading to very high strain rates up to $10^4$. As a result of the Lorentz forces, plastic deformation of the build-up material occurs while noticeably reducing the residual stress within the deformed part of the material. A typical set-up for electromagnetic forming processes includes the following components:

- capacitor banks as a source of electrical energy for the discharge current and the appropriate charging control units,
- a power converter for supplying charging current for the capacitor banks,
- a power distribution module,
- a low resistance high current switch, designed for extremely short switching times and thus extremely short pulses,
- a wiring system providing high current, low inductance, low resistance transport capabilities for delivering discharge current from the capacitor banks to at least one magnetic coil, and
- at least one magnetic coil designed to evoke the desired geometric form of the electromagnetically deformed build-up material.

The properties of the electromagnetic forming process can be adjusted by varying the discharge parameters of the capacitor banks. The magnitude of the induced Lorentz forces and, thus, the magnitude of the plastic deformation of the material is directly affected by the magnitude of the discharge current sent to the at least one magnetic coil, whereas the strain-rate of the deformation process can be influenced by a variation of excitation frequency and of the duration of the discharge current and, thus, by a variation of the magnetic pulse length. The method of electromagnetic forming exhibits a variety of advantages over conventional forming methods, the most important of which being electromagnetic forming being applicable as a contactless procedure and, therefore, causing considerably less wear out effects in the manufacturing equipment. Furthermore, it is possible to carry out the deposition process with a low cost and highly flexible robot arm since only low weight magnetic coils arranged to follow the wire feeder must be additionally mounted to a standard wire feed additive manufacturing apparatus. The magnetic coils being fabricated as low weight components ensure high flexibility in terms of geometric design of the coils leading to numerous possible shapes, the most prominent of which being flat and U-shaped. Conclusively, it is also possible to preserve the so-called grain refining effect occurring during mechanical rolling treatment of deposited build-up material to reduce material waste due to inserting high amounts of energy into the material and therefore spontaneously triggering grain growth in a plurality of locations within the material. Additionally, the grain size can be influenced by a variation of the strain rate of the deformation process using electromagnetic forming techniques.

The life period of the equipment components used to relieve the residual stresses is considerably increased due to the contactless procedure. Furthermore, the magnitude of the plastic deformation can be tuned by the magnitude of the discharge current pulse. Moreover, the strain rate of the deforming process can be influenced by the excitation frequency and the current discharge duration.

According to a first preferred embodiment of the invention, the plastic strain of the build-up material caused by the pulsed magnetic field is to be greater than 10% within the area of deposition. This condition has been derived from experimental observations exhibiting stable processing parameters within the specified range of material strain and ensuring substantial relief of distortion within the material build-up due to high plastic strain.

According to a further preferred embodiment of the invention, the pulse length of the pulsed magnetic field is in a range between 1 μsec and 1 msec, depending on the materials, which are subjected to plastic deformation by electromagnetic forming. Within the given range of magnetic pulse lengths, the strain rate can be varied to a range of 10000 l/sec to 100 l/sec resulting in a considerable reduction of residual stress within the build-up material during deformation.

In a further aspect of the invention, the temperature range at which the build-up material is subjected to the at least one magnetic pulse is set to a range of 50% to 80% of the melting temperature of the build-up material. This ensures that the build-up material is still warm, but not in a liquid state when being subjected to the at least one magnetic pulse resulting in controllable deformation properties of the material, along with being able to achieve the required strain rates as discussed before. Furthermore, unwanted dropouts of liquid build-up material during the deformation process are safely prevented.

In addition, a further aspect of the invention suggests that the build-up material is subjected to a series of subsequent magnetic pulses, wherein the number of subsequent magnetic pulses may be between 2 and 10, preferably 3 and 5. By applying subsequent pulses accordingly, it is possible to achieve a higher degree of plastic deformation without sacrificing mechanical stability due to extensive mechanical strain.

A beneficial variation of the invention can be obtained by subjecting the build-up material to a plurality of magnetic fields emanating from a plurality of magnetic coils arranged in various positions around the build-up material. In this way, more complex geometries can be formed by simultaneous subjecting or delayed subjecting of the build-up material to various magnetic fields, each of which can be easily tuned in terms of pulse magnitude and pulse length to fulfill the exact demands of the geometry desired to be plastically formed.

The problem is furthermore solved by an apparatus for performing the above mentioned method, including a wire feeding means for feeding wire to a melting spot where the wire is melted for forming a build-up material along the moving direction, a heating means for heating the wire at the melting spot, at least one magnetic coil means arranged to generate a magnetic field around and in the build-up material in moving direction behind the melting spot, and an electric energy supply means for supplying pulse shaped electric energy to the said coil means.

The apparatus exhibiting the aforementioned properties is equipped with means for performing methods of wire feeding additive manufacturing and electromagnetic forming, preferably with a variable arrangement of the at least one coil means in order to maximize the apparatus' areas of possible applications. Preferably, the magnetic coil means includes a so-called pancake coil of disk shape, which usually has one or two layers of spirally formed electric lines. This enables to exert forces on flat metallic substrates.

Preferably, the holding structure of the apparatus is arranged onto a handling arm allowing the holding structure to be movable into at least three translatory degrees of freedom. This proposed arrangement can be achieved, e.g., by mounting the holding structure onto a handling arm of a robotic device being able to integrate the apparatus into a highly automated production line to ensure constant reproducibility of the parts being manufactured and subjected to plastic deformation by the apparatus. This is made possible, because the novel means incorporate basically only a light weight magnetic coil in addition to the wire feeder and melting device.

In a further extension, the apparatus' coil means is suggested to exhibit a planar, preferably disc-like shape. Using that kind of geometric design, magnetic fields strongly adjusted into one direction can be created allowing exact controllability of the field strength and the pulse length. This geometric coil design is especially recommended if there is only one direction in which plastic deformation of the build-up material is desired.

As a variation of the preceding invention's extent, it is proposed for the coil means to feature a U-shaped cross section with a central portion and two adjacent side portions, which surround the build-up material from the top and both sides. With this type of coil means, magnetic fields emanating from various spatial directions can be applied to the build-up material, resulting in the apparatus being able to create plastic deformation of the build-up material from various directions. In this way, more geometrically complex geometries can be formed using the combination of wire feed additive manufacturing and electromagnetic forming, by subjecting the build-up material to at least one magnetic pulse emanating from only one magnetic coil means with the shape.

As a final extent of the invention, the apparatus is proposed to feature two coil means arranged to exert Lorentz forces from two distinct directions. In this way, the apparatus is equipped to simultaneously apply independently controllable Lorentz forces within the build-up material, resulting in being able to create more sophisticated and complex geometric designs by plastic deformation of the build-up material than it would be possible with just one magnetic coil means. However, this means that each of the two magnetic coil means must be equipped with the necessary supplemental means to provide the necessary coils' high current feeds via capacitor bank means, being fed by an electrical supply means and being interconnected by a wiring system, being low on resistance and conductance.

Further advantages, properties, and distinctions of the invention derive from the following description in which, if necessary referring to the figures, at least one example is described in detail. Equal, similar, and/or analog parts are marked with the equal references.

DETAILED DESCRIPTION

Figure 1:
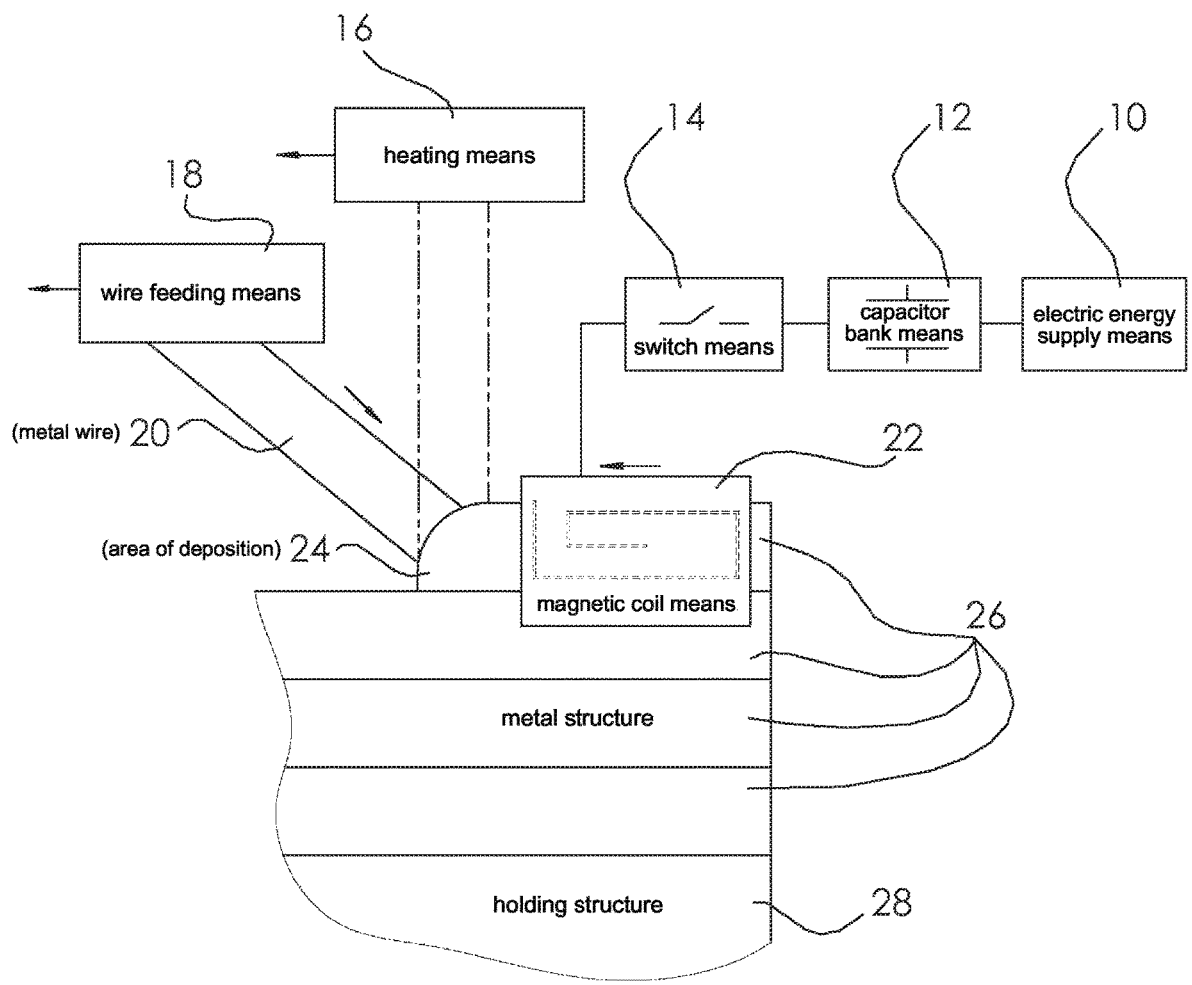
FIG. 1 is a schematic diagram of an apparatus for performing a method according to the invention in a side-view perspective.

FIG. 1 shows in a schematic diagram the basic principle of an apparatus for performing a method according to the invention in a side-view perspective. An electric energy supply means 10 is connected to a capacitor bank means 12 by a wire system designed to handle high currents and to be low on inductance and resistance. The capacitor bank means 12 is preferably designed to include a variety of single capacitor devices being lagged to maximize the resulting capacity of the capacitor bank means 12. A typical capacitor device has a capacity of 50 µF up to 400 µF. The typical discharge energy is between 200 J and 2000 J. The typical initial capacitor voltage is between 5 kV and 25 kV.

While the electric energy supply means 10 is arranged to charge the capacitor bank means 12, the capacitor bank means 12 can rapidly be discharged by activating a switch means 14 being designed to emit extremely short current pulses to at least one magnetic coil means 22 which is mounted close to a metal structure 26. Typical pulses are in the range of 1 µsec-1 msec.

The metal structure 26 is mounted onto a holding structure 28 being able to move the metal structure 26 into at least one direction. The metal structure 26 itself includes an area of deposition 24, where a metal wire 20 is being fed from a wire feeding means 18 and heated by a heating means 16, both of them also being able to move into the at least one direction. The heating means 16 is preferably designed to be a laser source specified to locally generate temperatures sufficient to melt common types of metals such as iron, steel or aluminum, while the wire feeding means 18 is typically arranged to be a roll-shaped device mounted onto a supporting structure. The metal wire 20 has typically an elliptical or prismatic cross section with the semimajor of 0.25 mm to 4 mm. The dimension of the semiminor is typically between 0.25 mm and 4 mm, too.

When the metal wire 20 is fed to the area of deposition 24 on the metal structure 26, it is immediately melted by the heating means 16 resulting in growth of build-up material on the metal structure 26. Shortly after deposition, the build-up material showing temperatures of 50% to 80% of its melting temperature in Kelvin is subjected to at least one pulsed magnetic field effecting plastic deformation caused by Lorentz forces within the build-up material as a response to the applied pulsed magnetic field and, thus, forcing the build-up material to alter shape according to a desired geometry. Preferably, a pulse series of 2 to 10, more preferably of 3 to 5 subsequent pulses is applied.

The plastic strain of the material is preferably chosen to be at least 10% within the area of deposition 24 in order to achieve substantial relief of mechanical stress and, thus, a significant reduction of distortion within the build-up material once being fed to the metal structure 26. The at least one pulsed magnetic field preferably exhibits a pulse length of 1 µsec to 1 msec resulting in strain rates of 10000 l/s to 100 l/s within the build-up material. These very high strain rates as compared to those of mechanical rolling (in the order of l/s) will result in an increase in formability and a reduction in wrinkling.

In a basic form of the invention, the magnetic coil means 22 is designed to be a planar-shaped, preferably disc-shaped, magnetic coil emitting pulsed magnetic fields into one preferred direction. In order to withstand high currents, the wires of the magnetic coil means 22 must be low on resistance. In order to be able to emit highly directed pulsed magnetic fields, the magnetic coils means 22 is also required to be low on inductance.

Figure 2:
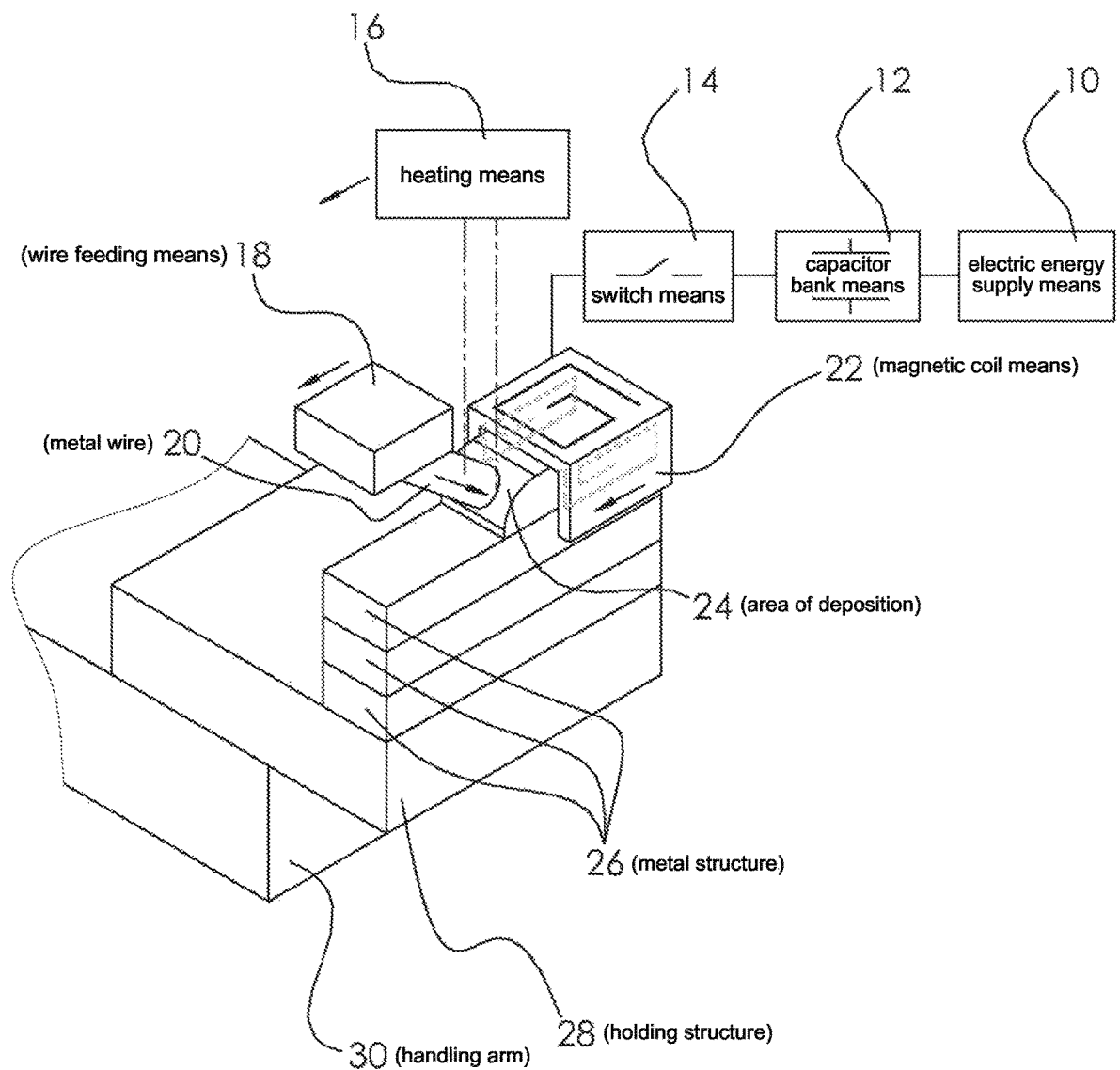
FIG. 2 is a schematic diagram of an apparatus for performing a method according to the invention in an isometric view.

In a further embodiment of the invention, the magnetic coil means 22 is designed to include two coil means arranged around the build-up material and thus being able to exhibit Lorentz forces from two distinct directions allowing the build-up material to be exhibited to spatially more complex plastic deformation. As a variation of the invention, it is also possible to design the magnetic coil means 22 to feature a U-shaped cross section with a central portion and two adjacent side portions, as shown in FIG. 2 and hinted in FIG. 1. The magnetic coil means 22 being designed in such way so as to exert Lorentz forces onto the build-up material from three distinct directions, allowing to force the build-up material into even more complex geometric forms.

In FIG. 2, the apparatus to perform a method according to the invention is shown in an isometric view. In this figure, the holding structure 28 is mounted onto a handling arm 30 of a robotic device allowing the holding structure 26 to move into at least three translatory degrees of freedom and, thus, enabling the apparatus to create even more geometrically complex parts using the described combination of wire feed additive manufacturing and electromagnetic forming.

LIST OF REFERENCES

10—Electric energy supply means;
12—Capacitor bank means;
14—Switch means;
16—Heat source/heating means;
18—Wire feeding means;
20—Metal wire;
22—Magnetic coil means;
24—Area of deposition;
26—Metal structure;
28—Holding structure; and
30—Handling arm.

The invention claimed is:

1. A method of forming a freeform metal structure by wire feed additive manufacturing, wherein the method comprises:
    moving a holding structure in at least one moving direction, the holding structure holding the metal structure;
    feeding a metal wire end along an area of deposition on the metal structure in the at least one moving direction;
    heating the metal wire end to a melting temperature using a heat source, the metal wire end as melted being deposited on the metal structure as a metallic build-up material; and
    subjecting the metallic build-up material after heating and during cooling in the at least one moving direction behind the area of deposition, when the metallic build-up material is non-liquid at 50%-80% of the melting temperature, to at least one pulsed magnetic field using a magnetic coil arranged after the heat source, wherein the at least one pulsed magnetic field produces opposite directed interaction to a current induced in the build-up material from deposition causing the build-up material to undergo plastic deformation with a strain rate in a range of 1000 1/sec-100 1/sec that influences grain refinement properties within the build-up material while reducing residual mechanical stress within the build-up material resulting from strain that provides mechanical stability within the build-up material during the plastic deformation.

2. The method of claim 1, wherein plastic strain of the build-up material caused by the at least one pulsed magnetic field is greater than 10% within the area of deposition.

3. The method of claim 1, wherein the at least one pulsed magnetic field has a pulse length of 1 μsec-1 msec.

4. The method of claim 1, wherein subjecting the metallic build-up material to at least one pulsed magnetic field comprises applying a pulse series of 2-10 pulses.

5. The method of claim 4, wherein a pulse of the pulse series comprises phases of alternating currents creating Lorentz forces in opposite directions.

6. The method of claim 1, wherein the method comprises subjecting the metallic build-up material to two magnetic fields simultaneously.

7. An apparatus to form a freeform metal structure by wire feed additive manufacturing, wherein the apparatus comprises:
a holding structure moveable in at least one moving direction;
a wire feeding means for feeding a metal wire end along an area of deposition on the metal structure in the at least one moving direction;
a heating means for heating the metal wire end to a melting temperature, the metal wire end as melted being deposited on the metal structure as metallic build-up material; and
at least one magnetic coil means arranged after the heating means for subjecting the build-up material after heating and during cooling in the moving direction behind the area of deposition, when the metallic build-up material is non-liquid at 50%-80% of the melting temperature, to at least one pulsed magnetic field, wherein the at least one pulsed magnetic field produces opposite directed interaction to a current induced in the build-up material from deposition causing the build-up material to undergo plastic deformation with a strain rate in a range of 1000 1/sec-100 1/sec that influences grain refinement properties within the build-up material while reducing residual mechanical stress within the build-up material resulting from strain that provides mechanical stability within the build-up material during the plastic deformation.

8. The apparatus of claim 7, wherein the holding structure is arranged on a handling arm allowing at least three translatory degrees of freedom of the holding structure.

9. The apparatus of claim 7, wherein the at least one magnetic coil means is planar in shape.

10. The apparatus of claim 7, wherein the magnetic coil means has a U-shaped cross section with a central portion and two adjacent side portions surrounding the build-up material from top and both sides, respectively.

11. The apparatus of claim 7, wherein two coil means are arranged to exert Lorentz forces from two distinct directions.

12. The method of claim 4, wherein the pulse series includes 3-5 pulses.

13. The apparatus of claim 7, wherein the apparatus comprises an electric energy supply means for supplying pulse shaped electric energy to the at least one magnetic coil means.

* * * * *